(12) United States Patent
Zhang et al.

(10) Patent No.: US 9,207,668 B2
(45) Date of Patent: Dec. 8, 2015

(54) METHOD OF AND APPARATUS FOR AUTOMATED PATH LEARNING

(75) Inventors: Hui Zhang, Shanghai (CN); Torgny Brogardh, Vasteras (SE); Jianjun Wang, West Hartford, CT (US); George Zhang, Windsor, CT (US)

(73) Assignee: ABB Research Ltd., Zurich (CH)

( * ) Notice: Subject to any disclaimer, the term of this patent is extended or adjusted under 35 U.S.C. 154(b) by 1559 days.

(21) Appl. No.: 11/884,809

(22) PCT Filed: Feb. 10, 2006

(86) PCT No.: PCT/US2006/004677
§ 371 (c)(1),
(2), (4) Date: Aug. 21, 2007

(87) PCT Pub. No.: WO2006/093652
PCT Pub. Date: Sep. 8, 2006

(65) Prior Publication Data
US 2009/0125146 A1    May 14, 2009

Related U.S. Application Data

(60) Provisional application No. 60/656,435, filed on Feb. 25, 2005.

(51) Int. Cl.
  *G05B 19/18*    (2006.01)
  *G05B 19/423*   (2006.01)
  *B25J 9/16*     (2006.01)

(52) U.S. Cl.
  CPC ............. *G05B 19/423* (2013.01); *B25J 9/1664* (2013.01); *G05B 2219/36404* (2013.01); *G05B 2219/36409* (2013.01); *G05B 2219/40385* (2013.01)

(58) Field of Classification Search
  CPC ....................................................... G06F 19/00
  USPC ........ 318/568.17, 568.15; 700/245, 253, 252, 700/260, 172; 409/125, 126, 131
  See application file for complete search history.

(56) References Cited

U.S. PATENT DOCUMENTS

4,224,501 A * 9/1980 Lindbom et al. ......... 219/124.34
4,368,913 A   1/1983 Brockmann et al.
(Continued)

FOREIGN PATENT DOCUMENTS

DE   33 11 526 A1   10/1984
WO   94/20262       9/1994

OTHER PUBLICATIONS

Frederick Proctor, "Control Sensors for Advanced Manufacturing", Proceedings of the International Manufacturing Technology Forum, Chicago, IL., Jun. 4-5, 1992.
(Continued)

*Primary Examiner* — Luke Huynh
(74) *Attorney, Agent, or Firm* — Michael M. Rickin

(57) ABSTRACT

A robot having a force sensor and a tool fixture for operating on a workpiece that may have a complex surface contour is programmed by an operator first teaching the robot by a suitable technique such as lead through teaching a few gross points of the contour. These points, known as guiding points, are used to generate a program to be followed by the robot under the control of the robot controller and using force control during which the robot finalizes the guiding points and teaches one or more points on the contour intermediate adjacent guiding points. The controller or other computing device uses the points so taught to generate the path the robot tool fixture will follow when the tool is to operate on the workpiece.

21 Claims, 6 Drawing Sheets

(56) References Cited

U.S. PATENT DOCUMENTS

| | | | |
|---|---|---|---|
| 4,408,286 A | | 10/1983 | Kikuchi et al. |
| 4,429,266 A | | 1/1984 | Tradt |
| 5,006,999 A | * | 4/1991 | Kuno et al. .............. 700/253 |
| 5,128,103 A | | 7/1992 | Wang et al. |
| 5,471,406 A | * | 11/1995 | Breyer et al. ............ 702/168 |
| 5,732,195 A | * | 3/1998 | Nakata et al. ........... 700/260 |
| 5,880,956 A | * | 3/1999 | Graf ......................... 700/86 |
| 6,285,920 B1 | | 9/2001 | McGee et al. |
| 6,385,508 B1 | | 5/2002 | McGee et al. |
| 7,149,599 B2 | * | 12/2006 | Arai et al. ............... 700/186 |
| 7,523,561 B2 | * | 4/2009 | McFarland ................ 33/554 |
| 2005/0080512 A1 | | 4/2005 | Critchlow |
| 2006/0178775 A1 | | 8/2006 | Zhang et al. |
| 2006/0181236 A1 | * | 8/2006 | Brogardh ............... 318/568.1 |

OTHER PUBLICATIONS

Authorized Officer Thomas Black, ISA/US, International Search Report having a mailing date of Sep. 6, 2006 in International Application No. PCT/US2006/004677 (inventors Zhang et al.) published as WO2006/093652.

Authorized Officer Agnes Wittmann-Regis, International Bureau of WIPO, PCT Notification Concerning Transmittal of International Preliminary Report on Patentability (Chapter I of the Patent Cooperation Treaty) having an issuance date of Aug. 28, 2007 with the Written Opinion of the International Searching Authority of Thomas Black Authorized Officer having a completion date of Jul. 20, 2006 in International Application No. PCT/US2006/004677 (inventors Zhang et al.) published as WO2006/093652.

Communication from the Europen Patent Office having date of May 23, 2011with the Extended European Search Report that includes the Supplementary European Search Report dated Apr. 29, 2011 and the European Search Opinion in European Application No. 06734706 (inventors Zhang et al.) published as EP185403.

Dieter Boley, "Sensorunterstutztes Programmierverfahren fur das Entgraten mit Industrierobotern", 1988, Springer Verlag, Berlin, Heidelberg, pp. 31-32, 61-70 and 91-93 and figures 7, 22, 27-34, 38 and 50 in German with an English translation.

* cited by examiner

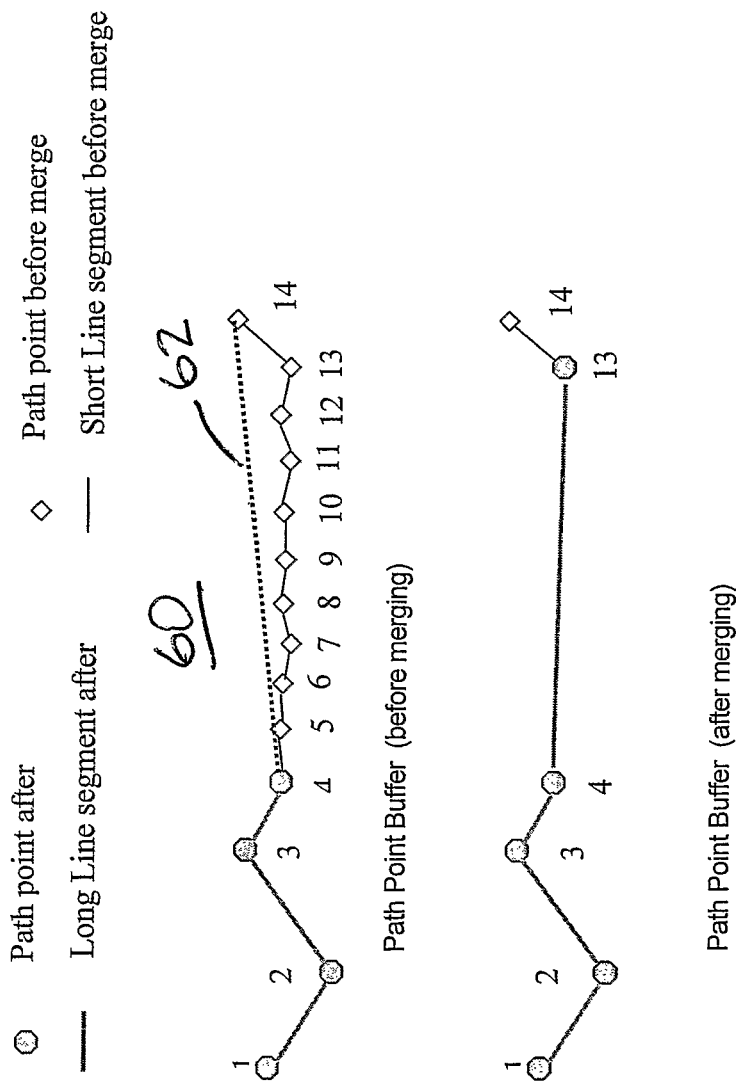

METHOD OF AND APPARATUS FOR AUTOMATED PATH LEARNING

CROSS REFERENCE TO RELATED APPLICATION

This application claims the priority of U.S. provisional patent application Ser. No. 60/656,435 filed on Feb. 24, 2005, entitled "Method For Automated Robot Path Learning" the contents of which are relied upon and incorporated herein by reference in their entirety, and the benefit of priority under 35 U.S.C. 119(e) is hereby claimed.

FIELD OF THE INVENTION

The present invention relates to robots and more particularly to a method and apparatus for automated robot motion programming.

DESCRIPTION OF THE PRIOR ART

Programmable robots are commonly used for a variety of repetitive industrial applications. As appreciated, a robot only performs tasks and motions that are preprogrammed. Programming of robot motions can be a complicated and time-consuming process. Methods of reducing programming time include programming robot motions by lead through teaching in real setup and offline programming in a computer simulated setup. Lead through teaching is disclosed generally in U.S. Pat. No. 4,408,286 ("the '286 Patent").

The typical lead through teaching methods include the steps of moving the robot through a set of desired motions, sensing specific points during the movement of the robot, recording the specific points in a microprocessor, and utilizing the recorded points to create movement commands. The robot repeats the desired motions according to the created movement commands. An operator programming a robot utilizing a lead through teaching method is responsible for guiding the robot and for maintaining the desired position and orientation of the robot in three or more dimensions. A drawback to conventional lead through teaching methods is that an operator must constantly guide the robot through motions burdened with the requirement to accurately guide the robot through the desired motion while never allowing a collision with an object in the workspace and never allowing the robot to apply excessive pressure to the workpiece.

As shown in FIG. 1, the operator deburring a workpiece, such as automotive part 14, that has a complex contour can easily manipulate a hand held deburring or polishing tool 12 which is shown in FIG. 1 as attached to the end effector of a robot 10. When the same polishing tool 12 is attached to the end effector of the robot 10, the task becomes burdensome to the operator and intuitive movements by the operator made with the polishing tool 12 become difficult, resulting in less then desirable programmed movements of the robot 10. Additionally, the workpiece 14 or the tool 12 can be damaged if the deburring tool 12 inadvertently crashes with the workpiece 14 or applies excessive pressure to the workpiece 14 due to the operator's inability to overcome the inertial forces of the robot 10 or to otherwise guide the robot 10 along the desired path.

Improvements in the prior art for the lead through teaching method include the use of various types of teaching handles (not shown) that aid the operator in guiding the robot through the desired motions. Teaching handles improve the operator's mechanical advantage over the robot, however the operator is still left to manipulate and accurately control the robot through the desired motions while maintaining control in three or more dimensions. One example of such a handle is shown and described in U.S. patent application Ser. No. 11/051,383 filed on Feb. 4, 2005 and assigned to the same assignee as the present invention. Another example of such a handle is shown and described in U.S. Pat. No. 6,385,508. A handle is described but not shown in U.S. Pat. No. 6,285,920 which also describes joy-stick jogging of the robot.

The offline programming method requires that a computer model is available for the workpiece and an accurate calibration equipment and procedure is available to convert the program data in the simulated setup into the program data in the robot setup. As a result, this method cannot be utilized if the computer model is not available or the calibration accuracy does not suffice to meet the process requirement.

Consequently, there is a need for a method and apparatus that allows the operator to program robot motions with minimum effort in the real setup so that the process requirement and motion path are presented together and the operator can provide in-situ and timely judgment for any particulars in programming the robot. Further, it is desirable that a spatial relationship between the robot and the workpiece is constantly maintained without any burden on the operator. Further, it is also desirable that the robot and the workpiece never collide even for applications where close contact is necessary. Further, it is desirable to free the operator from having to guide the robot in three dimensions for all the program points in a complex path during programming operations in an effort to reduce the complexity of programming desired motions of the robot. Further, simplification of the teaching operation allows for more efficient and automated teaching of robot motions, making frequent programming of programmable robots for small batch jobs economically feasible.

As is described in more detail below, the present invention allows the operator to first teach the robot the gross spatial relationship between the robot fixture and the workpiece, such relationship referred to hereinafter as guiding points, and then allow the robot under control of the robot controller to follow the path that the controller has determined from the guiding points and use force control to update the guiding points and also to learn one or more points intermediate adjacent guiding points to thereby generate a program for the path the robot will follow when the robot is used to perform the desired operation on the workpiece. That desired operation may for example, and without limitation, be deburring, polishing or milling.

The off-line teaching of guiding points is described by Frederick Proctor Proceedings Of The International Manufacturing Technology Forum, Chicago, Ill., Jun. 4-5, 1992 "Control Sensors For Advanced Manufacturing". Proctor, however, does not teach using force control to learn one or more points intermediate adjacent guiding points. Published PCT application WO 94/20262 teaches using the guiding points and force control during the machining of a workpiece but as is the case with Proctor does not teach using force control to learn one or more points intermediate adjacent guiding points before the robot is used to perform the desired operation on the workpiece.

SUMMARY OF THE INVENTION

A method for creating in a controller of a robot prior to the robot performing work on a known workpiece contour a program to follow a path to use a real tool held by the robot to perform work on the workpiece known contour, the method comprising:

operating, prior to the robot performing work on the workpiece contour, the robot to use a tool that is either the real tool or a tangible tool that cannot perform work on the workpiece to obtain a plurality of guiding points related to the workpiece contour, one or more of the plurality of guiding points not on the workpiece contour, the path to be followed when the robot uses the real tool perform work on the workpiece not including the one or more of the plurality of guiding points not on the workpiece contour;

defining, prior to the robot performing work on the workpiece contour, from the plurality of guiding points a path including the plurality of guiding points for movement of the robot holding the tool that is either the real tool or the tangible tool relative to the workpiece contour;

moving, prior to the robot performing work on the workpiece contour, the robot holding the tool that is either the real or the tangible tool using as a guide the path including the plurality of guiding points;

using, prior to the robot performing work on the workpiece contour, a signal from a force sensor on the robot to determine, when the robot is holding the tool that is either the real tool or the tangible tool and moves prior to the robot performing work on the workpiece contour to follow the path including the plurality of guiding points, if the moving real or tangible tool is in contact with the workpiece contour;

the controller changing in response to the force sensor signal, when the robot holding the real tool or the tangible tool moves prior to the robot performing work on the workpiece contour and is following the path including the plurality of guiding points and is not in contact with the workpiece contour, the direction of the moving tool that is either the real or the tangible tool so as to bring the moving tool in contact with the workpiece contour;

gathering one or more points intermediate the guiding points when the robot holding the tool that is either the real or the tangible tool moves the tool prior to the robot performing work on the workpiece contour to contact the workpiece contour but not perform work on the workpiece contour; and using the gathered one or more points intermediate the guiding points and the guiding points in contact with the contour to define the path for the robot holding the real tool to follow when the real tool is to perform work on the workpiece contour.

A computer program product comprising:

a non-transitory computer readable medium for creating prior to a robot performing work on a known contour of a workpiece a program which when executed causes the robot to follow a path that allows the robot to use a real tool to perform work on the known contour;

a computing device for executing the computer program product;

computer usable program code configured to operate, prior to the robot performing work on the workpiece contour, the robot to use a tool that is either the real tool or a tangible tool that cannot perform work on the workpiece to obtain a plurality of guiding points related to the workpiece contour, one or more of the plurality of guiding points not on the workpiece contour, the path to be followed when the robot uses the real tool to perform work on the workpiece not including the one or more of the plurality of guiding points not on the workpiece contour;

computer usable program code configured to define, prior to the robot performing work on the workpiece contour, from the plurality of guiding points a path including the plurality of guiding points for movement of the robot holding the tool that is either the real tool or the tangible tool relative to the workpiece contour;

computer usable program code configured to move, prior to the robot performing work on the workpiece contour, the robot holding the tool that is either the real tool or the tangible tool using as a guide the path including the plurality of guiding points;

computer usable program code configured to use, prior to the robot performing work on the workpiece contour, a signal from a force sensor on the robot to determine, when the robot is holding the tool that is either the real tool or the tangible tool and moves prior to the robot performing work on the workpiece contour to follow the path including the plurality of guiding points, if the robot is in contact with the workpiece contour;

computer usable program code configured to use the computing device in response to the force sensor signal to change, when the robot moves prior to the robot performing work on the workpiece contour and is holding the tool that is either the real tool or the tangible tool and is following the path including the plurality of guiding points and is not in contact with the workpiece contour, the direction of the moving tool so as to bring the tool that is either the real tool or the tangible tool in contact with the workpiece contour;

computer usable program code configured to gather one or more points intermediate the guiding points when the robot holding the tool that is either the real tool or the tangible tool moves the tool prior to the robot performing work on the workpiece contour to contact the workpiece contour without the tool performing work on the workpiece contour; and computer usable program code configured to use the one or more points intermediate the guiding points and the guiding points in contact with the contour to define the path for the robot holding the real tool relative to the workpiece to follow when the real tool is to perform work on the workpiece.

A system for creating prior to a robot performing work on a known contour of a workpiece a program which when executed causes the robot to follow a path that allows the robot to use a real tool held by the robot to perform work on the workpiece known contour, the system comprising:

a computing device having therein program code usable by the computing device, the program code configured to:

operate, prior to the robot performing work on the workpiece contour, the robot to use a tool that is either the real tool or a tangible tool that cannot perform work on the workpiece to obtain a plurality of guiding points related to the workpiece contour, one or more of the plurality of guiding points not on the workpiece contour, the path to be followed when the robot uses the real tool to perform work on the workpiece not including the one or more of the plurality of guiding points not on the workpiece contour;

define, prior to the robot performing work on the workpiece contour, from the plurality of guiding points a path including the plurality of guiding points for movement of the robot holding the tool that is either the real tool or the tangible tool relative to the workpiece contour;

move, prior to the robot performing work on the workpiece contour, the robot holding the tool that is either the real tool or the tangible tool using as a guide the path including the plurality of guiding points;

use, prior to the robot performing work on the workpiece contour, a signal from a force sensor on the robot to determine, when the robot is holding the tool that is either the real tool or the tangible tool and moves prior to the robot performing work on the workpiece contour to follow the path including the plurality of guiding points, if the robot is in contact with the workpiece contour;

change using the force sensor signal, when the robot holding the tool that is either the real tool or the tangible tool moves prior to the robot performing work on the workpiece contour and is following the path including the plurality of guiding points and is not in contact with the workpiece contour, the direction of the moving tool that is either the real tool or the tangible tool so as to bring the moving tool in contact with the workpiece contour;

gather one or more points intermediate the guiding points when the robot holding the tool that is either the real tool or the tangible tool moves the tool prior to the robot performing work on the workpiece contour to contact the workpiece contour without the tool performing work on the workpiece contour; and use the one or more points intermediate the guiding points and the guiding points in contact with the contour to define the path for the robot holding the real tool relative to the workpiece to follow to perform work on the workpiece contour.

DESCRIPTION OF THE DRAWING

FIG. 6 shows an example of a post processing algorithm for the recorded spatial relationship of the robot fixture relative to the workpiece.

DETAILED DESCRIPTION

Figure 1:
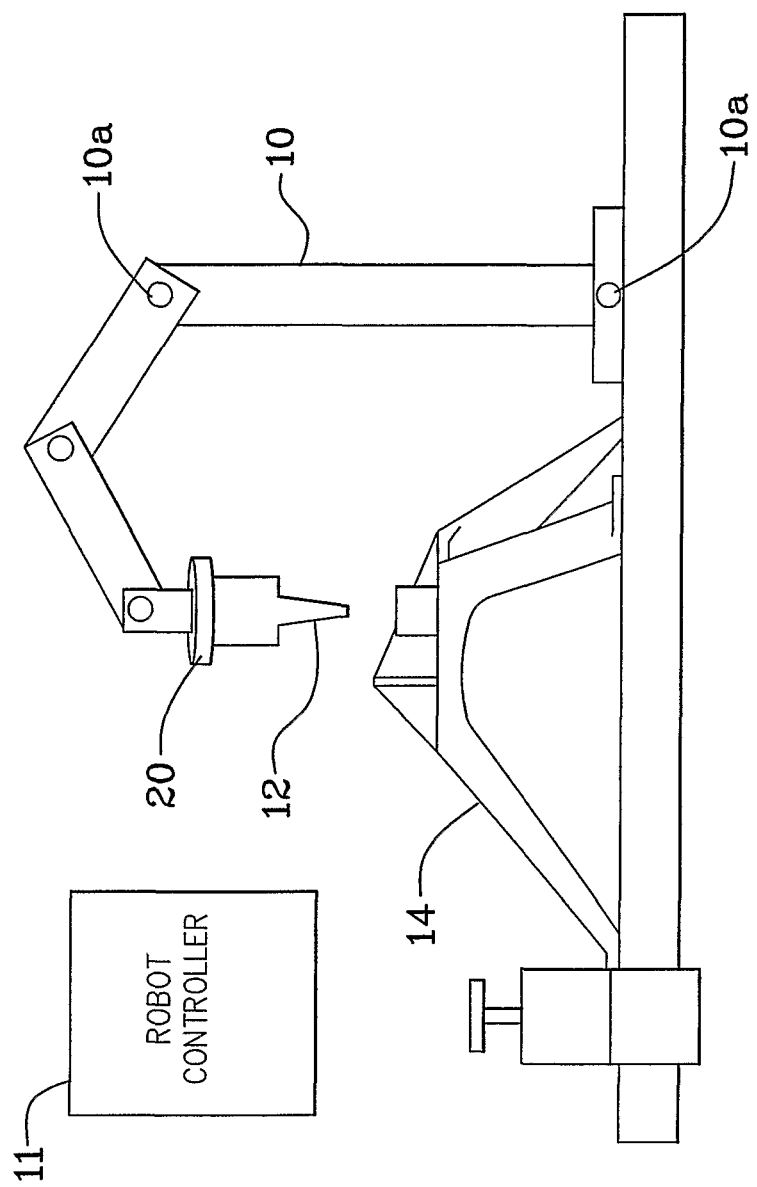
FIG. 1 shows a robot including a tool fixture for cooperation with a workpiece.

Referring to the Figures, wherein like numerals indicate like or corresponding parts throughout the several views, a method of and apparatus for programming a robot is disclosed. As is shown in FIG. 1, the robot 10 includes a tool fixture 12 for cooperating with a workpiece 14, at least one force sensor 20, and at least one motor 10a controlled by a robot controller 11. The tool fixture 12 for cooperating with the workpiece 14 may comprise any type of tool known in the art. Examples of such tools include a deburring tool tip, water-jet cutting tip, a laser cutting tip, a welding tip, a polishing wheel, etc.

The software that performs the method of the present invention is resident in the controller 11 and can be loaded into the controller 11 from a computer readable medium, including but not limited to a CD-ROM or a flash drive, or by other well known means such as, for example, by connecting controller 11 to an intranet or the Internet, and downloading the software from the same site where controller 11 is located or from another site that is remote from the site where controller 11 is located. As is well known to those of ordinary skill in the art, the software that performs the method of the present invention may also be resident on a computing device (not shown) other than controller 11 that interfaces with robot 10. The software can be loaded into that computing device by any one of a number of well known techniques, including but not limited to, those described above.

The automated path learning of the present invention may be used in connection with many different processes. One example of such a process is a deburring application, shown in FIG. 2, that requires the programming of the complex path 141 with irregular contours. This process requires that extra material left on the part body or workpiece 14 from the previous process (e.g., the casting of the part) in the form of burr or flash be removed from the part body 14 using a milling pin without cutting into the part. Prior art and current practice requires that the robot programmer teach the robot 10 and thus controller 11 many points, which may in a deburring or other process be hundreds of points, to obtain an accurate path to duplicate the exact shape or contour 141 of the workpiece 14. This process is extremely time consuming and labor intensive.

Figure 2:
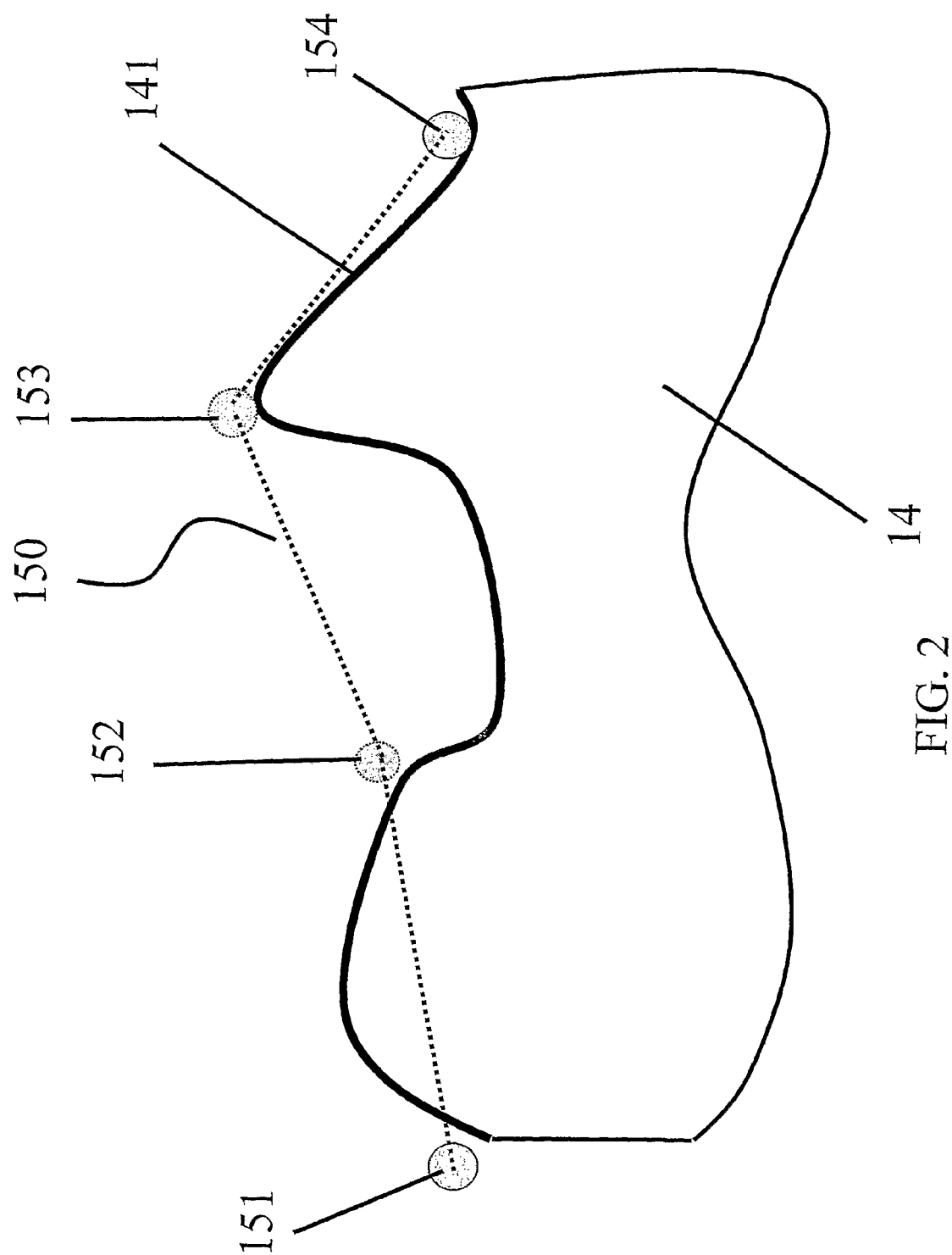
FIG. 2 shows an example of a path for a deburring application.

As shown in FIG. 2, the method of the present invention starts by teaching a few guiding points 151, 152, 153 and 154, which typically represent sharp changes in the contour of the workpiece 14. As is shown in FIG. 2 at guiding points 151 and 152, the guiding points do not need to be physically on the workpiece 14. In other words, the deburring tool tip does not need to touch the workpiece 14. However, it is generally required, but not necessary, that the tool 12 is in the same preferred orientation to the workpiece 14 as in the actual process.

The guiding points 151-154 can be taught by any of a number of methods, including the conventional remote joystick jogging or keyed jogging. A preferred method is lead through teaching. Lead-through robot programming is disclosed generally in the '286 Patent. This programming method is different from the teach pendant method described above in which the robot is moved through a programming path of motion by use of a robot teach pedant. Rather lead-through teaching uses a force sensor 20 of FIG. 1 attached to the robot end effector to move the robot 10 through the programming path points. As previously described, several methods of lead-through teaching and handle assemblies utilized for lead-through teaching are disclosed after the '286 Patent.

Next, a robot program based is generated in the robot controller 11 based on the linear segment of the guiding points 151-154, resulting in a program path 150. As is shown in FIG. 2, the program path 150 generated in controller 11 for workpiece 14 is far different from the actual contour 141. If the tool fixture 12 could follow program path 150 it would either move into the part 14 as shown by the segment of path 150 between points 151 and 152 or be too far away from the workpiece 14 as shown by the segment of path 150 between points 152 and 153, neither of which is desirable.

As is described in more detail below, the method of the present invention prevents this from occurring as it uses the compliant motion mode, that is, force control, to allow the tool fixture 12 under the control of controller 11 to use the program path 150 to orient the tool fixture 12 relative to the workpiece contour 141 so that the tool fixture follows contour 141 to teach one or more points on the contour that are intermediate adjacent guiding points 151-154. In addition the force control keeps the tool fixture 12 from striking the workpiece 14 as it would in the absence of force control if it tried to follow the portion of path 150 between guiding points 151 and 152 or brings the tool fixture 12 adjacent to the workpiece 14 as it follows the path 150 between guiding points 152 and 153.

Figure 3:
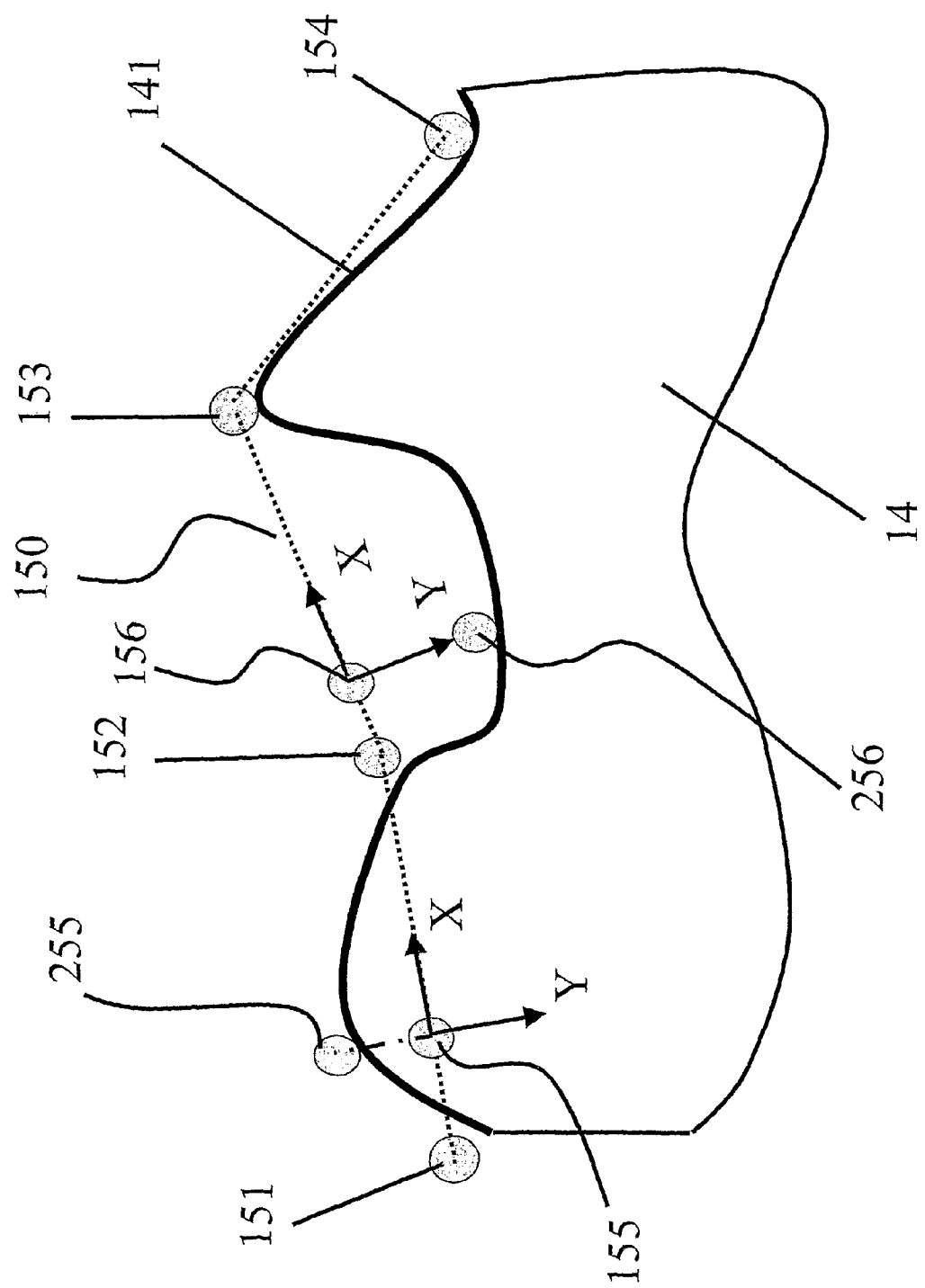
FIG. 3 shows how the robot is taught the path of FIG. 2.

Referring to FIG. 3, for clarity in explanation for this particular example, a path coordinate system Xp, Yp is shown in the figure. The path direction is referred to as the Xp direction. While the robot 10 is programmed to move along the path 150, the robot controller 11 is engaged in a compliant motion mode, such that only in direction Yp, which is perpendicular to path direction Xp, robot motion is force controlled, while all other directions and orientations are still under position control. Therefore, it should be appreciated that while the robot 10 is programmed to execute the path 150 during the teaching of the intermediate points, the robot will deviate from path 150 and, as is described below, follow the contour 141 of workpiece 14 because the controller 11 is in the compliant motion mode.

Further, it can be specified in the controller 11 that a constant contact force in the Yp direction (e.g., 20 N) is maintained. Because of this constraint, if the program path 150 is into the actual workpiece contour as shown for point 155, the tool tip will yield along the Yp axis until it reaches the equilibrium, of 20 N, resulting in a new point 255 which is physically on the workpiece contour. On the other hand, if the program path 150 is away from the workpiece 14, as in case of point 156, the controller would bring the tool tip closer to the work-piece 14 until the equilibrium is reached of 20 N, resulting in a new point 256. Therefore, it should be appreciated that but for the compliant force mode the tool fixture 12 would follow path 150. If the tool fixture 12 followed path 150, the tool fixture 12 would strike the workpiece 14 when the tool fixture 12 tries to move along that part of 150 between points 151 and 152 and be too far away from the contour 141 when the tool fixture 12 moves along that part of path 150 between points 152 and 153. The use of the compliant force mode ensures that this does not happen and that the tool fixture 12 follows the contour 141 to learn the intermediate points such as for example the intermediate points 255 and 256 shown in FIG. 3.

As described above, in the teaching of the intermediate points on the contour 141 the robot 10 holding the tool fixture 12 is moving in the compliant motion mode along the workpiece contour 141. During that teaching, the actual robot position and orientation are continuously recorded. As described above, the tool tip would always be in continuous contact with the workpiece 14, resulting in a recorded spatial relationship that is the exact replicate between the tool fixture 12 and the workpiece 14, and a robot program generated based on the recorded path can be directly used to carry out the actual process. When the robot 10 is executing the actual process, it is not necessary for the robot controller 11 to engage any force control behavior, unless such control would benefit the process.

It should be appreciated that new points 255 and 256 described above are examples of points on the contour of workpiece 14 that are intermediate adjacent guiding points. It should be further appreciated that the intermediate points 255 and 256 are not taught to robot 10 as described above in connection with FIG. 2, but are learned by the robot 10 using the method of the present invention. Thus, the method of the present invention has a first step whereby the robot 10 is taught several guiding points such as points 151-154 and a second step whereby the robot controller 11 causes the robot tool fixture 12 to use both the path 150 determined from the guiding points 151-154 to orient the tool fixture 12 to the workpiece 14 and force control to finalize the guiding points and one or more points intermediate adjacent guiding points to thereby determine the path to be followed by tool fixture 12 when it performs the desired operation on workpiece 14.

Sometimes it is desirable but not necessary to have a post processing step in the form of a post processing algorithm that operates on the continuously recorded spatial relationship, which can be conveniently recorded with a constant distance (e.g., 2 mm) between each adjacent point. As can be appreciated by one skilled in the art, in a contour where the curvature changes slowly, points with a larger distance in between the points are acceptable for the process while in the contour where the curvature changes sharply, dense points are still necessary. After the post processing step, a more efficient program with less program data can be generated for production use.

The post processing algorithm is a further improvement of the continuously recorded path. In practice, the continuously recorded path is time sampled which can give rise to many thousands of points. For example, if the time sampling occurs every 4 ms and the robot is moving at 4 mm/s, then 1000 points/s or 1000 points/4 mm are recorded. These recorded points are the "intermediate points" described herein. This large number of points gives a great accuracy to the spatial relationship between the robot tool fixture 12 relative to the workpiece 14, however, in cases where the contour of the workpiece does not change that dramatically, it is a waste of resources. The post processing algorithm processes this large volume of points intelligently by removing unnecessary intermediate points so that the final path has both enough fine details and a minimum number of points.

One example of such a post processing algorithm is described below with reference to FIG. 6. This algorithm performs post processing by merging in real-time short line segments into one longer line segment subject to a set of user-defined criteria.

In this algorithm, a path point buffer 60 of FIG. 6 is setup to hold the incoming path points from the real-time position recording function. Every time the position recording function pushes a new point (point 14 of FIG. 6) into buffer 60, the post-processing is activated to scan the buffer 60 and try to merge shorter line segments into one longer line segment. As appreciated, during the path learning process merged segments (points 1 to 4 of the upper part of FIG. 6) and un-merged line segments (points 4 to 14 of the upper part of FIG. 6) coexist in the buffer 60. Post-processing only deals with unmerged points (points 4 to 14).

The algorithm checks if two or more long line segments are formed by the unmerged points 4 to 14 according to a Path Accuracy Parameter specified by the user of the algorithm. This determination of the formation of two or more long line segments is achieved by verifying the distance of each unmerged point (point 4 to point 14) to the line 62 connecting the first unmerged point (point 4) and the last unmerged point (point 14). If there is one distance greater than the Path Accuracy Parameter, merging is then performed as shown in the lower part of FIG. 6 by deleting all the points between the first unmerged point (which in this example is point 4) and the breakpoint (which is this example is point 13). The breakpoint is defined as the very first point where the distance is greater than the Path Accuracy Parameter occurs.

Post processing can also be used to correct the learned positions and orientations. This often happens for demanding applications such as arc welding where the posture of the tool is required to maintain fixed spatial relations with the path.

For most processes, such as a deburring process with a milling tool, it is usually required that the tool maintain a certain angle with the work surface. This requirement is first achieved while teaching the guiding points when the operator can determine the required angle at each taught guiding point. This is where the lead through programming method is desirable for intuitiveness and convenience. While the robot is in compliant continuous motion where the robot uses compliant force control to finalize the guiding points and teach one or more and possibly as described above thousands of intermediate points, this desired angle is still preserved since the orientation of the robot is still in closed-loop position control. When the desirable angle between two guiding points are different, all existing industrial robot controllers will provide an interpolated orientation between the two points, which is preserved in the step of compliant path learning. As is described above the set of compliant path learning is where the robot uses compliant force control to finalize the guiding points and teach one or more and possibly thousands of intermediate points, resulting in a continuous and smooth transition between the two distinctive guiding points.

To facilitate the above programming process, an artificially tangible tool with the same guiding dimensions as the real process tool is usually desirable. For example, in the deburring process with an end milling tool, moving the tool with a sharp cutting edge along the workpiece surface can create undesirable friction and damage to the part's surface. However, an artificially tangible tool with a cylindrical shape that has the same dimension as the real tool eliminates the problem and greatly enhances the programming experience.

Figure 4:
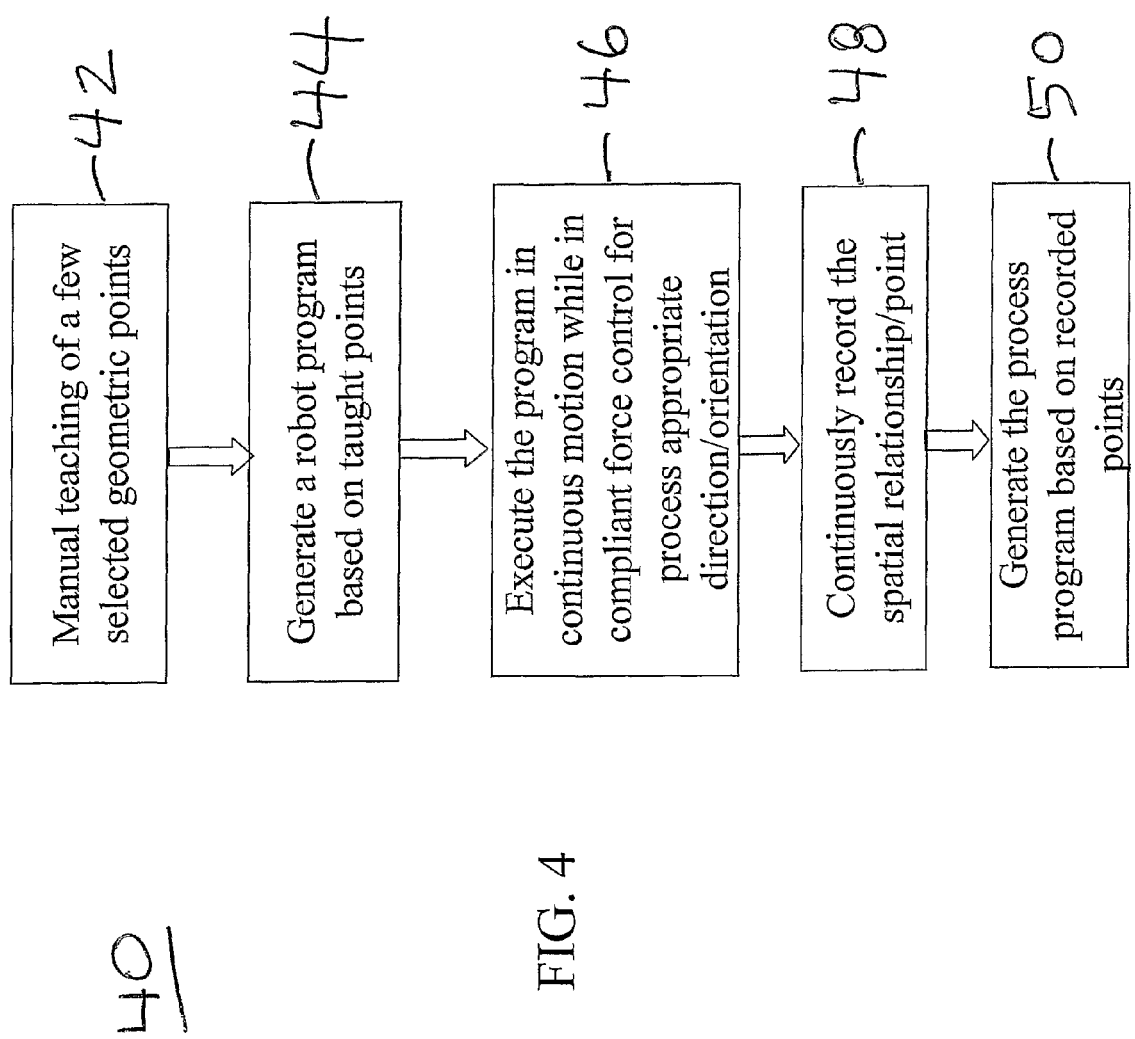
FIG. 4 shows a flow chart of the method according to the invention.

Referring to FIG. 4, there is a flowchart 40 for the method of the present invention. The method begins at 42 in which a few selected guiding spatial relationships between the robot fixture 12 and the workpiece 14, that is the guiding points such as points 151-154 of FIG. 2, are taught. The guiding point could be obtained by lead through teaching, manually jogging the robot or from a computer model. The method then proceeds to 44 in which the controller 11 or another computing device generates a computer program based on the taught guiding points. The method then continues to 46 in which the program generated at 44 is executed in continuous movement with the robot based on the taught coarse guiding points while the robot 10 is engaged in compliant force control in the direction(s) appropriate in the particular process so that the tool fixture 12 is always in contact with the workpiece 14 and follows the desired contour 141 of the workpiece 14. At 48 the method continuously records the spatial relationship and each taught intermediate point of the robot fixture 12 relative to the workpiece 14 during movement of the robot 10 which is under compliant force control. At 50 the method generates the robot motion program based on the recorded spatial relationship and each taught intermediate point which is the exact desired program for the given setup. While not shown in FIG. 4, the method of the present invention may also include the post processing of the desired program described above.

The method of the present invention is unique in that it uses the contact behavior of the robot under compliant force control so that such movement of the robot 10 follows the exact process path to be programmed. During this procedure, the operator is only involved with the first step of teaching the gross movement of the robot 10, while the bulk of the steps are automated with the robot controller 11.

It is easy to realize that the steps shown in FIG. 4, are suitable for being executed by a computer program having instructions corresponding to the steps in the method when run on a processor unit. Preferably, the computer program is run on a processor in the control system of the robot.

Figure 5:
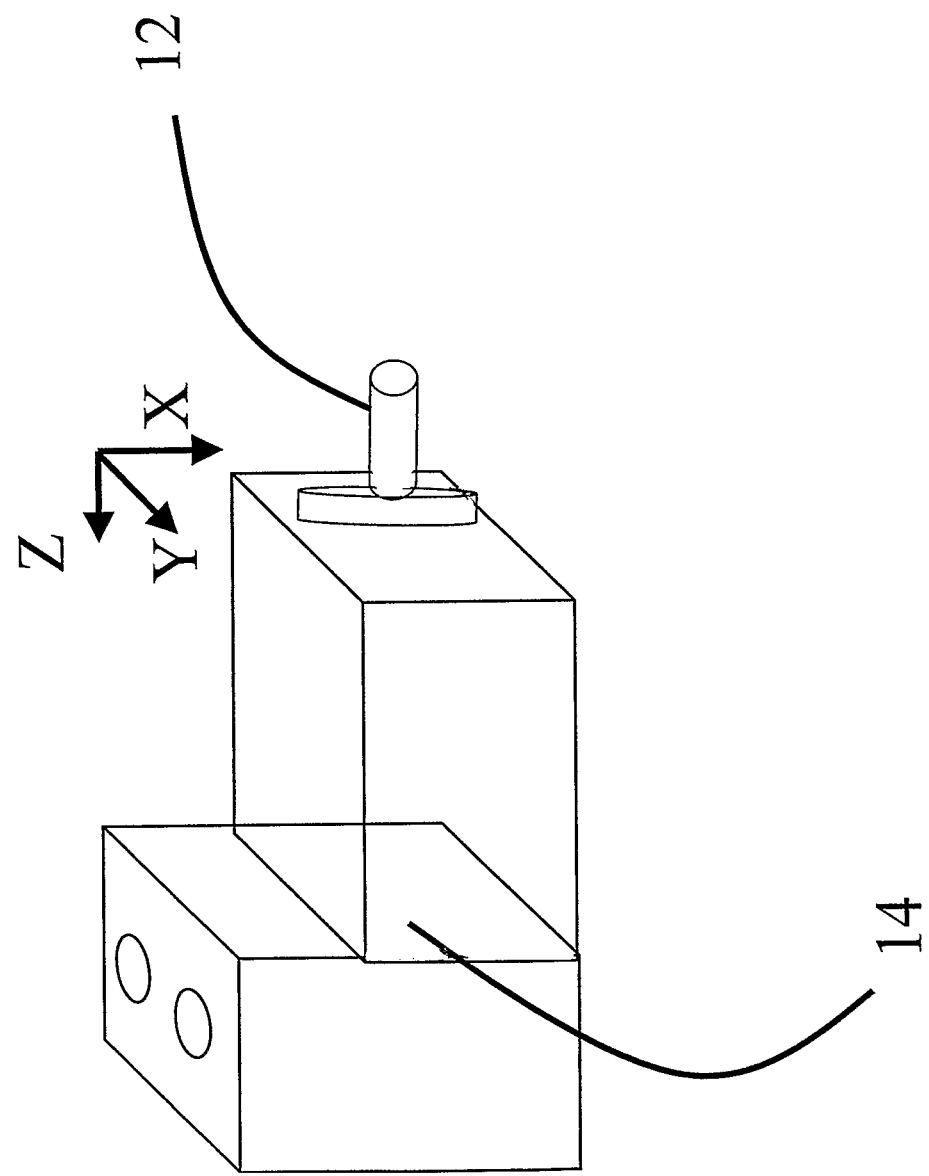
FIG. 5 show another example of a workpiece and a tool fixture.

FIG. 5 shows a workpiece 14 and a tool 12 processing the workpiece. The coordinate system shown in the figure is a tool coordinate system $X_T, Y_T, Z_T$, where $Z_T$ is perpendicular to the surface of the workpiece and $X_T, Y_T$ are perpendicular to $Z_T$. $Rx_T$ is rotation about the $X_T$ axis and $Ry_T$ is rotation about the $Y_T$ axis.

As can be appreciated, the present invention can provide tremendous savings in time and cost for the teaching and programming of a robot, especially for applications and processes where tool fixture and workpiece contact is required, for example, a deburring process. With little modification, the same programming principle can be readily applied to other processes, such as a milling or cutting process where alignment of tool orientation with the cutting plane is of ultimate importance. It is then appropriate in that case to activate compliant force control in the $Z_T, Rx_T, Ry_T$ direction/orientation to allow surface alignment, as shown in FIG. 5, so the tool/surface orientation can be easily obtained.

In general, the present invention is aimed at programming the target of a trajectory using force control while teaching only a few and simple guiding points. The prior art solution is for general curvature tracking. This works for surface programming, but is a slow method that requires a lot of operator work to define where on the surfaces the tracking is needed and how to handle discontinuities and surface roughness.

The method of the present invention can also utilize a CAD (Computer Aided Design) method for offline programming of suitable points for the programming of the object coordinate system, definition of guiding points (which means that manual teaching of the guiding points is not needed) along the surfaces or edges that the trajectory is defined relative to, and the definition of force directions along the trajectory for fine tuning.

It should be appreciated that the present invention allows an operator to program robot motions with minimum effort in the real setup so that the process requirement and motion path are presented together and the operator can provide in-situ and timely judgment for any particulars in programming the robot. It should further be appreciated that the present invention allows that a spatial relationship between the robot and the workpiece is constantly maintained without imposing a burden on the operator to maintain that relationship.

It should also be further appreciated that the present invention prevents the robot and the workpiece from colliding even for applications where close contact is necessary. It should also be appreciated that the present invention frees the operator from having to guide the robot in three dimensions for all the program points in a complex path during programming operations in an effort to reduce the complexity of programming desired motions of the robot.

The simplification of the teaching operation provided by the present invention allows for more efficient and automated teaching of robot motions, making frequent programming of programmable robots for small batch jobs economically feasible.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for creating in a controller of a robot prior to said robot performing work on a known workpiece contour a program to follow a path to use a real tool held by said robot to perform work on said workpiece known contour, said method comprising:

operating, prior to said robot performing work on said workpiece contour, said robot to use a tool that is either said real tool or a tangible tool that cannot perform work on said workpiece to obtain a plurality of guiding points related to said workpiece contour, one or more of said plurality of guiding points not on said workpiece contour, said path to be followed when said robot uses said real tool perform work on said workpiece not including said one or more of said plurality of guiding points not on said workpiece contour;

defining, prior to said robot performing work on said workpiece contour, from said plurality of guiding points a path including said plurality of guiding points for movement of said robot holding said tool that is either said real tool or said tangible tool relative to said workpiece contour;

moving, prior to said robot performing work on said workpiece contour, said robot holding said tool that is either said real or said tangible tool using as a guide said path including said plurality of guiding points;

using, prior to said robot performing work on said workpiece contour, a signal from a force sensor on said robot to determine, when said robot is holding said tool that is either said real tool or said tangible tool and moves prior to said robot performing work on said workpiece contour to follow said path including said plurality of guiding points, if said moving real or tangible tool is in contact with said workpiece contour;

said controller changing in response to said force sensor signal, when said robot holding said real tool or said tangible tool moves prior to said robot performing work on said workpiece contour and is following said path including said plurality of guiding points and is not in contact with said workpiece contour, the direction of said moving tool that is either said real or said tangible tool so as to bring said moving tool in contact with said workpiece contour;

gathering one or more points intermediate said guiding points when said robot holding said tool that is either said real or said tangible tool moves said tool prior to said robot performing work on said workpiece contour to have said tool contact said workpiece contour without said tool performing work on said workpiece contour; and using said gathered one or more points intermediate said guiding points and said guiding points in contact with said contour to define said path for said robot holding said real tool to follow when said real tool is to perform work on said workpiece contour.

2. The method of claim 1 further comprising:

determining from said force sensor signal whether said moving robot holding said tool that is either said real or said tangible tool is attempting to move into said workpiece; and when said moving robot holding said tool that is either said real or said tangible tool is determined to attempt to move into said workpiece, changing the direction of said moving robot so as to bring said tool in contact with said workpiece contour.

3. The method of claim 2 wherein said gathering of said one or more points intermediate said guiding points occurs at fixed intervals of time.

4. The method of claim 1 further comprising:

using a predetermined criteria to reduce the number of said gathered one or more points intermediate said guiding points before defining said path to be followed by said robot holding said real tool when said real tool is to perform work on said workpiece.

5. The method of claim 4 further comprising:

determining when two or more adjacent gathered points intermediate said guiding points define said path to be followed by said robot holding said real tool when said real tool is to perform work on said workpiece within a predetermined criteria; and defining said path to be followed by said robot holding said real tool when said real tool is to perform work on said workpiece when said two or more adjacent gathered points intermediate said guiding points define said path to be followed by said robot holding said real tool when said real tool is to perform work on said workpiece within said predetermined criteria by deleting all of said two or more adjacent points intermediate said guiding points except for those of said two or more adjacent gathered points intermediate said guiding points that define said path to be followed by said robot holding said real tool when said real tool is to perform work on said workpiece within said predetermined criteria that are end points of said path to be followed by said robot holding said real tool when said real tool is to perform work on said workpiece so defined.

6. The method of claim 1 wherein said gathering of said one or more points intermediate said guiding points occurs at fixed intervals of time.

7. The method of claim 1 wherein said controller is a feedback controller.

8. A computer program product comprising:

a non-transitory computer readable medium for creating prior to a robot performing work on a known contour of a workpiece a program which when executed causes said robot to follow a path that allows said robot to use a real tool to perform work on said known contour;

a computing device for executing said computer program product;

computer usable program code configured to operate, prior to said robot performing work on said workpiece contour, said robot to use a tool that is either said real tool or a tangible tool that cannot perform work on said workpiece to obtain a plurality of guiding points related to said workpiece contour, one or more of said plurality of guiding points not on said workpiece contour, said path to be followed when said robot uses said real tool to perform work on said workpiece not including said one or more of said plurality of guiding points not on said workpiece contour;

computer usable program code configured to define, prior to said robot performing work on said workpiece contour, from said plurality of guiding points a path including said plurality of guiding points for movement of said robot holding said tool that is either said real tool or said tangible tool relative to said workpiece contour;

computer usable program code configured to move, prior to said robot performing work on said workpiece contour, said robot holding said tool that is either said real tool or said tangible tool using said path including said plurality of guiding points as a guide;

computer usable program code configured to use, prior to said robot performing work on said workpiece contour, a signal from a force sensor on said robot to determine, when said robot is holding said tool that is either said real tool or said tangible tool and moves prior to said robot performing work on said workpiece contour to follow said path including said plurality of guiding points, if said robot is in contact with said workpiece contour;

computer usable program code configured to use the computing device in response to the force sensor signal to change, when said robot moves prior to said robot performing work on said workpiece contour and is holding said tool that is either said real tool or said tangible tool and is following said path including said plurality of guiding points and is not in contact with said workpiece contour, the direction of said moving tool so as to bring said tool that is either said real tool or said tangible tool in contact with said workpiece contour;

computer usable program code configured to gather one or more points intermediate said guiding points when said robot holding said tool that is either said real tool or said tangible tool moves said tool prior to said robot performing work on said workpiece contour to have said tool contact said workpiece contour without said tool performing work on workpiece contour; and computer usable program code configured to use said one or more points intermediate said guiding points and said guiding points in contact with said contour to define said path for said robot holding said real tool relative to said workpiece to follow when said real tool is to perform work on said workpiece.

9. The computer program product of claim 8 further comprising:
computer usable program code configured to determine from said force sensor signal whether said moving robot holding said tool that is either said real tool or said tangible tool is attempting to move into said workpiece; and
computer usable program code configured to when said moving holding said tool that is either said real tool or said tangible tool is determined to attempt to move into said workpiece, change the direction of said moving tool so as to bring said fixture in contact with said workpiece contour.

10. The computer program product of claim 9 wherein said computer usable program code is configured to gather said one or more points intermediate said guiding points at fixed intervals of time.

11. The computer program product of claim 8 further comprising:
computer usable program code configured to use a predetermined criteria to reduce the number of said gathered one or more points intermediate said guiding points before defining said path for movement of said robot holding said real tool relative to said workpiece when said real tool is to perform work on said workpiece.

12. The computer program product of claim 11 further comprising:
computer usable program code configured to determine when two or more adjacent gathered one or more points intermediate said guiding points define said path for movement of said robot holding said real tool relative to said workpiece when said real tool is to perform work on said workpiece are within a predetermined criteria; and
define said path for movement of said robot holding said real tool relative to said workpiece when said real tool is to perform work on said workpiece when said two or more adjacent gathered one or more points intermediate said guiding points define said path for movement of said robot holding said real tool relative to said workpiece when said real tool is to perform work on said workpiece are within said predetermined criteria by deleting all of said two or more adjacent points intermediate said guiding points except for those of said two or more adjacent gathered points intermediate said guiding points that define said path for movement of said robot holding said real tool relative to said workpiece when said real tool is to perform work on said workpiece are within said predetermined criteria that are end points of said second path so defined.

13. The computer program product of claim 8 wherein said computer usable program code is configured to gather said one or more points intermediate said guiding points at fixed intervals of time.

14. The computer program product of claim 8 wherein said computing device is a feedback controller.

15. A system for creating prior to a robot performing work on a known contour of a workpiece a program which when executed causes said robot to follow a path that allows said robot to use a real tool held by said robot to perform work on said workpiece known contour, said system comprising:
a computing device having therein program code usable by said computing device, said program code configured to:
operate, prior to said robot performing work on said workpiece contour, said robot to use a tool that is either said real tool or a tangible tool that cannot perform work on said workpiece to obtain a plurality of guiding points related to said workpiece contour, one or more of said plurality of guiding points not on said workpiece contour, said path to be followed when said robot uses said real tool to perform work on said workpiece not including said one or more of said plurality of guiding points not on said workpiece contour;
define, prior to said robot performing work on said workpiece contour, from said plurality of guiding points a path including said plurality of guiding points for movement of said robot holding said tool that is either said real tool or said tangible tool relative to said workpiece contour;
move, prior to said robot performing work on said workpiece contour, said robot holding said tool that is either said real tool or said tangible tool using as a guide said path including said plurality of guiding points;
use, prior to said robot performing work on said workpiece contour, a signal from a force sensor on said robot to determine, when said robot is holding said tool that is either said real tool or said tangible tool and moves prior to said robot performing work on said workpiece contour to follow said path including said plurality of guiding points, if said robot is in contact with said workpiece contour;
change using said force sensor signal, when said robot holding said tool that is either said real tool or said tangible tool moves prior to said robot performing work on said workpiece contour and is following said path including said plurality of guiding points and is not in contact with said workpiece contour, the direction of said moving tool that is either said real tool or said tangible tool so as to bring said moving tool in contact with said workpiece contour;
gather one or more points intermediate said guiding points when said robot holding said tool that is either said real tool or said tangible tool moves said tool prior to said robot performing work on said workpiece contour to have said tool contact said workpiece contour without said tool performing work on said workpiece contour; and
use said one or more points intermediate said guiding points and said guiding points in contact with said contour to define said path for said robot holding said real tool relative to said workpiece to follow to perform work on said workpiece contour.

16. The system of claim 15 wherein said program code usable by said computing device further comprises code configured to:
determine from said force sensor signal whether said moving robot when holding said tool that is either said real tool or said tangible tool and following said path including said plurality of guiding points is attempting to move into said workpiece; and
when said moving robot is determined to attempt to move into said workpiece, change the direction of said moving robot so as to bring said tool in contact with said workpiece contour.

17. The system of claim 16 wherein said program code usable by said computing device further comprises code configured to gather said one or more points intermediate said guiding points at fixed intervals of time.

18. The system of claim 15 wherein said program code usable by said computing device further comprises code configured to:

use a predetermined criteria to reduce the number of said gathered one or more points intermediate said guiding points before defining said path for movement of said robot holding said real tool to perform work on said workpiece.

19. The system of claim 18 wherein said program code usable by said computing device further comprises code configured to:

determine when two or more adjacent gathered one or more points intermediate said guiding points define said path for movement of said robot holding said real tool to perform work on said workpiece within a predetermined criteria; and define said path for movement of said robot holding said real tool to perform work on said workpiece when said two or more adjacent gathered one or more points intermediate said guiding points define said path for movement of said robot holding said real tool to perform work on said workpiece within said predetermined criteria by deleting all of said two or more adjacent one or more points intermediate said guiding points except for those of said two or more adjacent gathered one or more points intermediate said guiding points that define said path for movement of said robot holding said real tool to perform work on said workpiece within said predetermined criteria that are end points of said path for movement of said robot holding said real tool to perform work on said workpiece so defined.

20. The system of claim 15 wherein said program code usable by said computing device further comprises code configured to gather said one or more points intermediate said guiding points at fixed intervals of time.

21. The system of claim 15 wherein said computing device is a feedback controller.

* * * * *